(12) United States Patent
Naumann et al.

(10) Patent No.: US 9,523,427 B2
(45) Date of Patent: Dec. 20, 2016

(54) HYDROSTATIC TRAVEL DRIVE AND MOBILE WORKING DEVICE WITH SUCH A TRAVEL DRIVE

(71) Applicant: Robert Bosch GmbH, Stuttgart (DE)

(72) Inventors: Sven-Ruediger Naumann, Wunstorf (DE); Heinz-Gerhard Essig, Lonsee (DE)

(73) Assignee: Robert Bosch GmbH, Stuttgart (DE)

( * ) Notice: Subject to any disclaimer, the term of this patent is extended or adjusted under 35 U.S.C. 154(b) by 300 days.

(21) Appl. No.: 14/249,029

(22) Filed: Apr. 9, 2014

(65) Prior Publication Data
US 2014/0298789 A1 Oct. 9, 2014

(30) Foreign Application Priority Data

Apr. 9, 2013 (DE) .................. 10 2013 206 190
Mar. 5, 2014 (DE) .................. 10 2014 203 973

(51) Int. Cl.
| | |
|---|---|
| *F16H 61/4017* | (2010.01) |
| *B60K 17/10* | (2006.01) |
| *F16H 61/4061* | (2010.01) |
| *F16H 61/4043* | (2010.01) |
| *F16H 61/456* | (2010.01) |

(52) U.S. Cl.
CPC .......... *F16H 61/4017* (2013.01); *B60K 17/10* (2013.01); *F16H 61/4043* (2013.01); *F16H 61/4061* (2013.01); *F16H 61/456* (2013.01)

(58) Field of Classification Search
CPC ... F16H 61/4017; F16H 61/452; F16H 61/456
See application file for complete search history.

(56) References Cited

FOREIGN PATENT DOCUMENTS

| | | |
|---|---|---|
| DE | 196 48 706 C2 | 9/1998 |
| DE | 10 2006 058 802 A1 | 6/2008 |
| DE | 10 2009 035 281 A1 | 2/2011 |
| EP | 2378166 A2 * | 10/2011 ......... F16H 61/4043 |

* cited by examiner

*Primary Examiner* — F. Daniel Lopez
(74) *Attorney, Agent, or Firm* — Maginot, Moore & Beck LLP

(57) ABSTRACT

A hydrostatic travel drive includes a hydraulic pump that is arranged in a hydraulic circuit with two pairs of hydraulic motors. To prevent a pressure build-up between the hydraulic motors of a hydraulic motor pair on steering while stationary, a valve device is configured to set a pressure relief to a working line or to low pressure. A mobile device includes the hydrostatic travel drive.

12 Claims, 5 Drawing Sheets

HYDROSTATIC TRAVEL DRIVE AND MOBILE WORKING DEVICE WITH SUCH A TRAVEL DRIVE

This application claims priority under 35 U.S.C. §119 to patent application nos. DE 10 2013 206 190.0 filed on Apr. 9, 2013 in Germany, and DE 10 2014 203 973.8 filed on Mar. 5, 2014 in Germany, the disclosures of which are incorporated herein by reference in their entirety.

BACKGROUND

The disclosure concerns a hydrostatic travel drive and a mobile working device with such a hydrostatic travel drive.

Such hydrostatic travel drives are used in general in vehicles, but in particular in agricultural utility vehicles such as tractors.

DE 10 2006 058 802 A1 discloses a hydrostatic travel drive in which several hydraulic motors are supplied with pressurized medium via a common distribution pump. In the simplest case, one hydraulic motor is assigned to the front axle and one to the rear axle, so that when both hydraulic motors (axle motors) are supplied with pressurized medium, the front and rear axles are driven. In a more complex exemplary embodiment, a hydraulic motor (wheel motor) is assigned to each wheel of the front and rear axles, wherein the motors are again connected in pairs in series, so that for all-wheel drive mode, the left wheels and the right wheels respectively are driven by two hydraulic motors connected in series.

A switch valve is arranged in the pressure medium flow path between the two series-connected hydraulic motors, and pretensioned in an open position in which a bypass line is opened, via which the pressurized medium flows back from the outlet of the upstream hydraulic motor, bypassing the downstream hydraulic motor, to the low pressure side of the travel drive, so that accordingly only the axle assigned to the upstream hydraulic motor is driven, while the downstream hydraulic motor effectively runs at idle since it is "carried" by the vehicle. To switch from this two-wheel drive to four-wheel drive mode, the switch valve is moved to a blocking position in which the bypass line to the low pressure is blocked, so that the second hydraulic motor is also supplied with pressurized medium. In this solution, switching from two-wheel to four-wheel drive is voluntary and dependent on the experience of the driver.

DE 196 48 706 C2 discloses a hydrostatic travel drive with two hydraulic motors, each of which is assigned to a wheel of a vehicle axle. In this hydrostatic travel drive, a valve device is provided via which the two hydraulic motors can be connected in series or in parallel. When connected in parallel, the two hydraulic motors are in practice exposed to the same pressure difference, so that on cornering, the flow quantities of the two hydraulic motors are balanced internally. When connected in series, cavitations can occur on cornering due to the different rotation speeds, but with series connection, synchronous running of the two hydraulic motors is rather guaranteed.

DE 10 2009 035 281 A1 discloses a generic hydrostatic travel drive in which a bypass line is assigned to each pair of hydraulic motors connected in series, via which line the supply to the respective downstream hydraulic motor is connected to its outlet. Two pretension valves are arranged in this bypass line in the form of spring-loaded check valves, which open in opposite directions and to which a switch valve is assigned, via which the bypass line can be opened or closed depending on the operating state of the vehicle. It is also known from the prior art that the travel drives explained above have articulated steering. Here two axles of a mobile working device are connected via an articulated joint and can pivot relative to each other, for example via hydraulic cylinders. Two wheels are assigned to each axle, and each wheel can be driven by a hydraulic motor. Hydraulically, the travel drive can here be designed in particular according to DE 10 2006 058 802 A1. On a steering movement of the articulated steering, i.e. when the axles pivot relative to each other, two wheels on one side of the vehicle with the articulated steering are moved towards each other along a curve-like track, while the two wheels on the other side move away from each other. The wheels of one side and hence the hydraulic motors of one series respectively are pressurized with opposing torques due to the steering movement. The opposing torques cause a rise in pressure in the pressure medium flow path between the series-connected hydraulic motors assigned to the wheels moving towards each other, while the pressure in the pressure medium flow path between the hydraulic motors of the other series diminishes.

This unilateral pressure build-up between the two hydraulic motors on the inside of the corner is problematical in particular when steering the mobile working device while stationary, since this pressure build-up counters the steering movement.

In contrast, the disclosure is based on the object of creating a hydrostatic travel drive and a mobile working device with such a hydrostatic travel drive, which also allows or eases steering movements when stationary.

SUMMARY

This object is achieved by a hydrostatic travel drive having the features of the disclosure, and by a mobile working device having the features of the disclosure.

Other advantageous refinements of the disclosure are the subject of the subclaims.

The hydrostatic travel drive according to the disclosure has a hydraulic pump which is in pressure medium connection via working lines with four hydraulic machines, in particular hydraulic motors, which are arranged in pairs. The hydraulic motors of one side of the mobile working device form a pair. The hydraulic motors of each pair are connected in series, wherein the outlet of a first of the two hydraulic motors is connected via a pressure medium flow path to the inlet of the second hydraulic motor.

The undesirable pressure build-up outlined above, in the pressure medium flow path between the hydraulic motors of a pair, is prevented or at least reduced according to the disclosure by a valve device, via which the pressure medium flow path with the higher pressure can be connected for pressure relief to one of the working lines or a low pressure region. In other words, on pressure build-up, this valve device creates a pressure medium connection to the working line or a region leading to the low pressure, so that the pressure medium flow path concerned is pressure-relieved and hence the steering movement of a mobile working device with articulated steering is significantly eased in relation to conventional solutions.

In a particularly preferred refinement, the pressure medium flow path with the higher pressure is connected to the working line serving as a supply line. This can have pump pressure. Thus in normal operation of the travel drive, when a pressure which is greater than the low pressure builds up in the pressure medium flow path between the hydraulic motors because of the great slip of the hydraulic motors arranged upstream, no pressure medium flows out of the pressure medium flow path via the valve device according to the disclosure, since the pressure in the working line serving as a supply line is always higher than the pressure in the pressure medium flow paths.

In a particularly preferred embodiment, this valve device is designed with a first change-over valve or valve device with corresponding function, the inlets of which are connected to the two pressure medium flow paths so that the greater of the two pressures in these pressure medium flow paths is tapped. The outlet of the change-over valve or corresponding device is connected via a pressure relief line with an outlet of a further change-over valve or corresponding valve device, the inlets of which are in pressure medium connection with the working lines. Consequently on a pressure build-up in one of the two pressure medium flow paths, a pressure medium connection to a working line is created so that the pressure medium flow path concerned is pressure-relieved.

In travel mode, in order to prevent an undesirable bypass flow from the working line carrying the high pressure to the pressure medium flow path or paths between the hydraulic motor pairs, a check valve can be provided in the pressure relief line which allows a pressure medium flow only in the direction towards the working line and blocks this in the opposite direction.

A flow valve, for example an orifice plate, a choke or a shuttle can be assigned to this check valve and ensures that a pressure drop occurs with the pressure relief flow described.

In a particularly preferred refinement, the valve device has two check valves and a change-over valve. The two check valves each have a spring-loaded closing body and their opening directions are directed towards the pressure relief line. The pressure relief line is connected to the outlet of the change-over valve, both inlets of which are connected to the working lines.

In a compact refinement, the two check valves are integrated in a valve block in which a flushing valve unit is also integrated. Preferably the flushing valve unit has a flushing valve, a nozzle and a pressure-retention valve.

In a particularly compact refinement, the change-over valve is also integrated in the valve block.

In a preferred embodiment, the travel drive according to the disclosure has a pressure shut-off valve, via which control pressure medium can be extracted from a control pressure line. Via this control pressure line, an actuating cylinder of the hydraulic pump can be supplied with control pressure medium by a feed pump via a pump control valve. A control pressure chamber acting in the opening direction of the pressure shut-off valve is connected, together with the pressure relief line, to the outlet of the change-over valve. Thus the change-over valve according to the disclosure can also be used to control the pressure shut-off valve, or the change-over valve of the pressure shut-off valve can also be used for the pressure relief of the pressure medium flow paths between the hydraulic motors according to the disclosure. Thus the technical complexity of the device is reduced in travel drives with pressure shut-off valve and with the valve device according to the disclosure.

The hydrostatic travel drive is preferably designed as a closed hydraulic circuit.

The mobile working device according to the disclosure is designed with such a hydrostatic travel drive and an articulated steering.

BRIEF DESCRIPTION OF THE DRAWINGS

Preferred exemplary embodiments of the disclosure are explained in more detail with reference to diagrammatic drawings.

These show.

DETAILED DESCRIPTION

Figure 1:
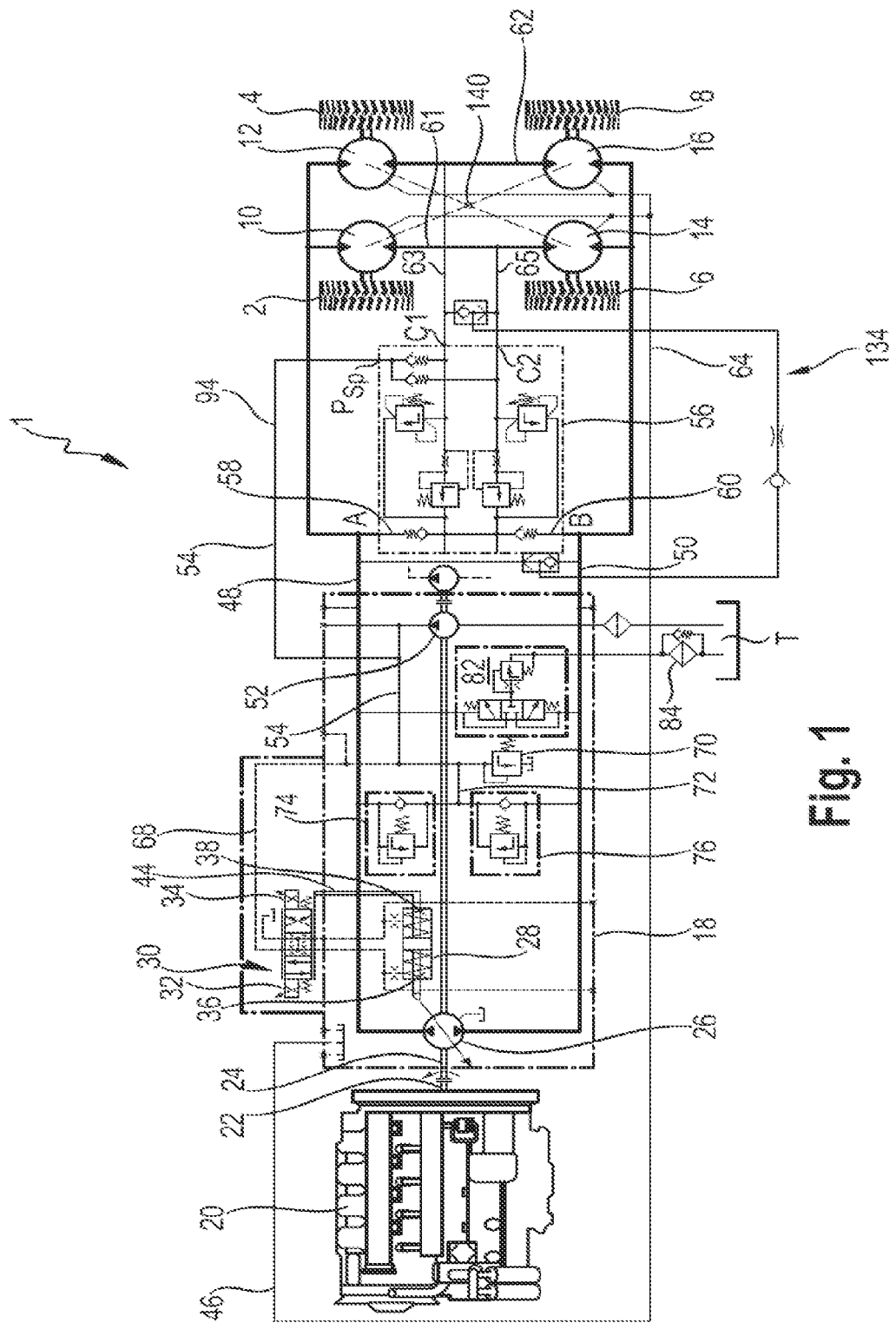
FIG. 1 a circuit diagram of a first exemplary embodiment of the hydrostatic travel drive according to the disclosure, FIG. 2 an enlarged view of an extract of the circuit diagram from FIG. 1

The hydrostatic travel drive 1 according to FIG. 1 is fitted in a mobile working device with articulated steering, for example an agricultural tractor. The working device is designed with all-wheel drive which can be operated in two-wheel or four-wheel drive mode depending on operating conditions. In the exemplary embodiment shown, a wheel motor is assigned to each wheel 2, 4 of a front axle and each wheel 6, 8 of a rear axle, said motors being referred to below as hydraulic motors 10, 12 (e.g. rear axle) or 14, 16 (e.g. front axle). Two hydraulic motors 10, 14; 12, 16 of each axle are connected in series into a hydraulic motor pair. The pressure medium for the hydraulic motors 10, 12, 14, 16 is supplied via a variable displacement pump unit 18 which is driven by the engine of the mobile working device, in the present case an internal combustion engine 20. An output shaft from the internal combustion engine 20 is connected via a coupling 22 with a drive shaft 24 of the variable displacement pump unit 18. The structure of such a variable displacement pump unit 18 is known from the prior art, so here only elements important for the understanding of the disclosure are explained.

Such a variable displacement pump unit 18 has a variable displacement pump 20 which can pivot over neutral and for example can be designed as an axial piston pump, the pivot angle of which is adjustable via an actuating cylinder 28. It is adjusted via an electrically adjustable pump control valve 30, for example designed as a servo valve, which can be adjusted via two proportional magnets 32, 34 out of a neutral position into a control position, in which pressurized medium is conducted into one of the two control chambers 36, 38 of the actuating cylinder 28 and the other control chamber is connected to the tank, so that one of the pistons of the actuating cylinder 28 is extended or retracted, wherein each such piston movement takes place against the force of one of the two return springs 40, 42. The position of the piston of the actuating cylinder 28 is reported back to the pump control valve 30 via a return linkage 44. The adjustment movement of the actuating cylinder 28 ends when the moment acting on the return linkage 44 stands in equilibrium with the magnetic moment provoked by the control current for the proportional magnets 32, 24; the control valve 30 is then back approximately in its middle position. This guarantees that a deflection of the actuating cylinder 28 and hence a pump delivery flow is assigned to each control current (control of proportional magnets 32, 34).

Leakage occurring in the variable displacement pump unit 18 is returned to a tank T via a leakage line 46.

The variable displacement pump 26 which can be pivoted over neutral is connected to the hydraulic motor arrangement 10, 12, 14, 16, via two working lines, where it is assumed below that the variable displacement pump 26 is set such that the pressure medium is delivered into a working line lying at the top in FIG. 1, referred to below as the supply line 48, which thus forms the high pressure line, while the pressure medium flows back from the hydraulic motors via another working line, referred to below as the outlet line 50 (low pressure side) to the supply port of the variable displacement pump 26. On pivoting of the variable displacement pump 26 over neutral, the pressure medium flow direction is reversed, so that the working line marked with reference numeral 50 then becomes the supply line and the working line marked with reference numeral 48 forms the outlet line.

The travel drive 1 is thus formed as a closed circuit, wherein any leakage losses can be compensated from the tank T. For this a feed pump 52 is provided which is also driven via a drive shaft 24. Via this feed pump 52, pressure medium is extracted from the tank T and delivered via feed valve units 74, 76 to the respective low pressure side, i.e. the working line lying at the outlet. These two feed valve units 74, 76 in principle each consist of a pressure-limiting valve and a check valve connected in parallel thereto, which allows a pressurized medium flow to the assigned working line and blocks it in the opposite direction. Two line portions 58, 60 branch off from the supply line 48 and outlet line 50 respectively and lead to ports A, B of a valve device 56. Each respective line portion 61 and 62, between the hydraulic motors 10, 14 or 12, 16 arranged in series, is connected via a channel 63 or 65 to a port C1 or C2 of the valve device 56.

Any leakage of the hydraulic motors 10 to 16 is discharged to the tank T via internal leakage lines 64.

As indicated in FIG. 1, in addition to the feed pump 52, further feed pumps can be provided to supply pressurized medium to further consumers or to compensate for leaks. Via the feed pump 52, control oil is provided for adjustment of the actuating cylinders 28 in a known manner. For this a control line 68 branches off from the feed line 54 and is guided to the inlet of the pump control valve 30. The pressure in the feed line 54 is limited via a feed-pressure limiting valve 70. To compensate for leaks, pressure medium can thus be fed into the low pressure side via the feed pump 52.

The basic structure of such a travel drive is known from the prior art cited initially, for example DE 10 2006 058 802 A1 and DE 10 2009 035 281 A1, so that with reference to these publications, no further explanation of the pump side part of the travel drive 1 is required.

The travel drive also has a flushing valve unit 82, via which pressurized medium can be branched from the respective low pressure branch, in particular from the outlet line 50, and flow via a filter 84 and where applicable a cooler to the tank T, and thus be regenerated. The pressure medium extracted is compensated via the feed pump 52 in the manner described.

Figure 2:
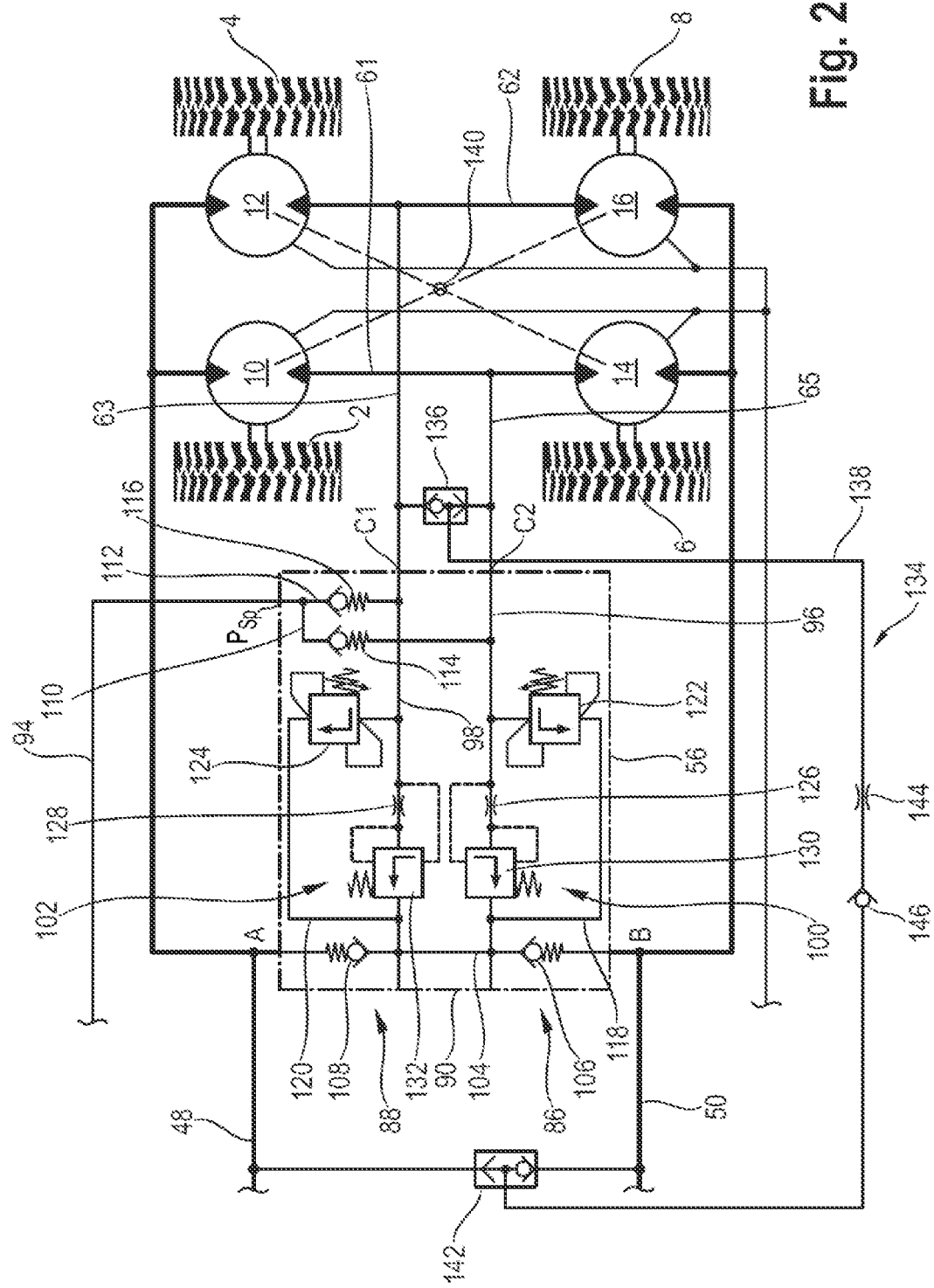

The valve device 56 is explained in more detail now with reference to FIG. 2.

According to FIG. 2, the valve device 56 is formed in two pieces with a lower valve unit 86 in FIG. 2, which is assigned to the line portion 61 between the hydraulic motors 10 and 14, and an upper valve unit 88 which is assigned to the line portion 62 between hydraulic motors 12 and 16. The valve units 86 and 88 are combined in a valve block 90 which is a so-called High Efficient Traction block (HET). This comprises ports C1 and C2 to which the channels 63 and 65 are connected respectively. The two channels 63 and 65 transform into bypass line portions 96, 98 of the valve units 86, 88, wherein a quantity limiting valve 100 or 102 designed as a flow control valve is arranged in each bypass line portion 96, 98. The bypass line portions 96 and 98 open downstream of their quantity limiting valves 100 and 102 into a common branch line 104, which is connected to ports A and B of the valve device 56. A spring-pretensioned check valve 106 or 108, opening in the pressure medium flow direction towards port B or port A respectively, is arranged downstream of the opening of the bypass line portions 96 and 98 in the branch line 104, which valve opens at a relatively high pressure of for example 14 bar and hence opens a pressure medium flow path to the respective low-pressure-side port B or A. The other check valve is held closed by the higher pressure in the high pressure branch.

The feed line 54 is connected via a feed channel 94 to the port $P_{Sp}$ of the valve device 56 and then branches into feed line portions 110 and 112. A spring-pretensioned feed check valve 114 or 116 is arranged in each of these feed line portions. The feed check valve 114 allows a pressure medium connection to the bypass line portion 96, while the other feed check valve 116 allows a pressure medium connection to the bypass line portion 98, and blocks it in the opposite direction.

The feed check valves 114 and 116 open in a pressure medium flow direction towards the bypass line portion 96 and 98 at a comparatively low pressure of around 1 bar, so that pressure medium can be conducted by the feed pump 52 in FIG. 1, via the feed line 54, feed channel 94 and the feed pressure limiting valve 114 or 116 in the respective low pressure branch, into the low pressure region between the hydraulic motors 10, 14 or 12, 16. This guarantees that at least the feed pump pressure is present at the respective inlet of the downstream hydraulic motors, i.e. in the present case hydraulic motors 14, 16.

Downstream of the opening of the feed line 110 or 112 in the bypass line portion 96 or 98, and upstream of the quantity limiting valve 100 or 102, a bypass line 118 or 120 branches off from the respective bypass line portion 96 or 98. A bypass valve 122 and 124 is arranged in this line, which valve is constructed as a pressure balance and comprises a valve slider pretensioned in a closed position via a spring force of a valve spring. A pressure downstream of the respective quantity limiting valve 100 and 102 acts in the same direction. A pressure upstream of the quantity limiting valve 100 or 102 acts on the valve slider of the respective bypass valve 118 or 120 in the opening direction. Consequently, the bypass valve 118 or 120 opens when a pressure difference over the quantity limiting valve 100 or 102 is equal to the pressure equivalent of the valve spring assigned to the bypass valve 122 or 124. In this case the pressure medium can flow via the feed pump 52 from FIG. 1 past the quantity limiting valve 100 or 102 into the branch line 104.

Each quantity limiting valve 100 or 102 is designed as a flow control valve which limits the maximum volume flow of the hydraulic motor pair 10, 14 or 12, 16 to the low pressure side. The flow control valve 100 or 102 is formed by a metering orifice plate 126 or 128 and a pressure balance 130, 132 arranged downstream thereof, the valve slider of which is pressurized in the opening direction by the force of the pressure balance spring and the pressure downstream of the metering orifice plate 126 or 128, and in the closing direction by the pressure upstream of the metering orifice plate 126 or 128. The pressure medium volume flow over the metering orifice plate 126 or 128 is therefore limited by the pressure balance 130 or 132. This means that depending on design of the quantity limiting valve 100 or 102, pressure medium flows out from the outlet of the upstream hydraulic motors 10, 12 via the pressure medium flow path 92 or 94 to the low pressure, so that no excessive pressure can build up in the supply to the downstream hydraulic motors 14, 16. Consequently, on terrain with good grip (no slip), the two upstream hydraulic motors 10, 12 and the corresponding wheels 2, 4 (see FIG. 1) are driven, while the two downstream hydraulic motors 14, 16 are merely "carried" by the vehicle and therefore run at idle. The rotation speed of the hydraulic motors 10 to 16 is however the same. The maximum permitted pressure medium volume flow through the quantity limiting valves 100 and 102 is designed such that, at a particular slip of the wheels 2, 4 (see FIG. 1) and the corresponding hydraulic motors 10, 12 due to the resulting increase in rotation speed of hydraulic motors 10, 12, a pressure is built up at the inlet to the two other hydraulic motors 14, 16 so that these are then engaged and the vehicle travels in all-wheel drive mode. This means that, by corresponding design of the quantity limiting valve 100 and 102, the permitted slip at the respective upstream hydraulic motor 10, 12 can be determined. When this slip of wheels 2 or 4 is exceeded, the respective downstream hydraulic motor 14 or 16 is engaged. No intervention of an operator is therefore required, so driving safety and operating comfort are quite considerably increased.

The switch from two-wheel drive to four-wheel drive described above evidently also takes place on pivoting of the variable displacement pump 26 over neutral and the corresponding reversal of travel direction.

In principle, the quantity limiting valve 100 or 102 can also be designed adjustably so that the permitted slip can be varied depending on operating conditions or travel direction.

To prevent an undesirable pressure build-up between the two hydraulic motors on the inside of the corner when steering the stationary mobile working device, a valve device 134 according to the disclosure is provided. This comprises a first change-over valve 136, via which the greater of the pressures in the regions between the hydraulic motor pairs 10, 14 or 12, 16 is tapped. In the concrete case, the two inlets of the first change-over valve 136 are connected to channels 63 and 65, or to the line segments 61 and 62, respectively. The outlet of the first change-over valve 136 opens into a pressure relief line 138 which leads to the outlet of the second change-over valve 142. The two inlets of this change-over valve 142 are then connected to the two working lines, in this case to the supply line 48 and the outlet line 50. An orifice plate 144 and a pressure relief check valve 146 are arranged in the pressure relief line 138 between the two change-over valves 136 and 138. Said check valve 146 allows a pressure medium flow from the outlet of the change-over valve 136 to the inlet of the change-over valve 142 and blocks a flow in the opposite direction. Instead of the orifice plate 144, evidently other corresponding valve devices can be used which generate a pressure fall in the pressure medium flow. Thus for example a choke or a shuttle can be used instead of the orifice plate 144.

When steering while stationary, as explained initially, a pressure builds up between the hydraulic motors of the hydraulic motor pair on the inside of the corner. The high-pressure-side line portion 61 or 62 concerned is then connected to the pressure relief line 138 via the first change-over valve 136. When stationary, approximately the same pressure can be present in both working lines. It is assumed here that the higher pressure is present in the inlet-side working line, i.e. in the supply line 48, so that the change-over valve 142 is switched to the position shown and hence the pressure relief line 138 is connected with the supply line 48. The pressure medium can flow out via the orifice plate 144, the opening pressure relief check valve 146 and the change-over valve 142, into the working line with a lower pressure, in the present case the supply line 48. In travel mode and with a corresponding pressure build-up in the supply line 48, a pressure medium flow in the opposite direction is suppressed by the pressure relief check valve 146. This function is the same for both forward and reverse motion, since the difference lies merely in that high pressure acts firstly in one working line and secondly in the other working line, and each time the other working line is then arranged on the low pressure side.

The valve device 134 according to the disclosure allows a mobile working device with articulated steering to be steered even when stationary without intervention of an operator.

Articulated steering with steering cylinders has been known from the prior art for some time, so for further information, reference is made thereto. A pivot axis 140 of the articulated steering is shown in FIG. 2, which lies approximately at the intersection of two diagonals connecting the hydraulic motors 10, 16 and 12, 14. Due to the articulated steering, the rear axle with wheels 2 and 4 and the front axle with wheels 6 and 8 can pivot relative to each other about the pivot axis 140. If the two axles are for example pivoted to the left by the articulated steering, wheels 2 and 6 of the one side move towards each other while wheels 4 and 8 of the other side move apart.

Evidently, instead of the change-over valves 136, 142, other suitable valve devices can be used via which the respective higher pressure in the associated pressure medium path can be tapped.

In the first embodiment example according to FIGS. 1 and 2, when steering the mobile working device while stationary, the pressure medium flow path or line portion 61, 62 on the inside of the corner, in which a pressure is building up, is connected via the change-over valve 136, orifice plate 144, the pressure relief check valve 146 blocking towards the change-over valve 136, and the second change-over valve 142, to the working line serving as the supply line 48 in which the higher pressure is present. The pressure is usually a low pressure up to 20 or 30 bar. However a higher pressure can be present if the variable displacement pump 26 has already been deployed. The pressure relief check valve 146 prevents pressure medium flowing from the working line serving as a supply line 48 directly into one of the pressure medium flow paths or line portions 61, 62 in normal operation.

Figure 3:
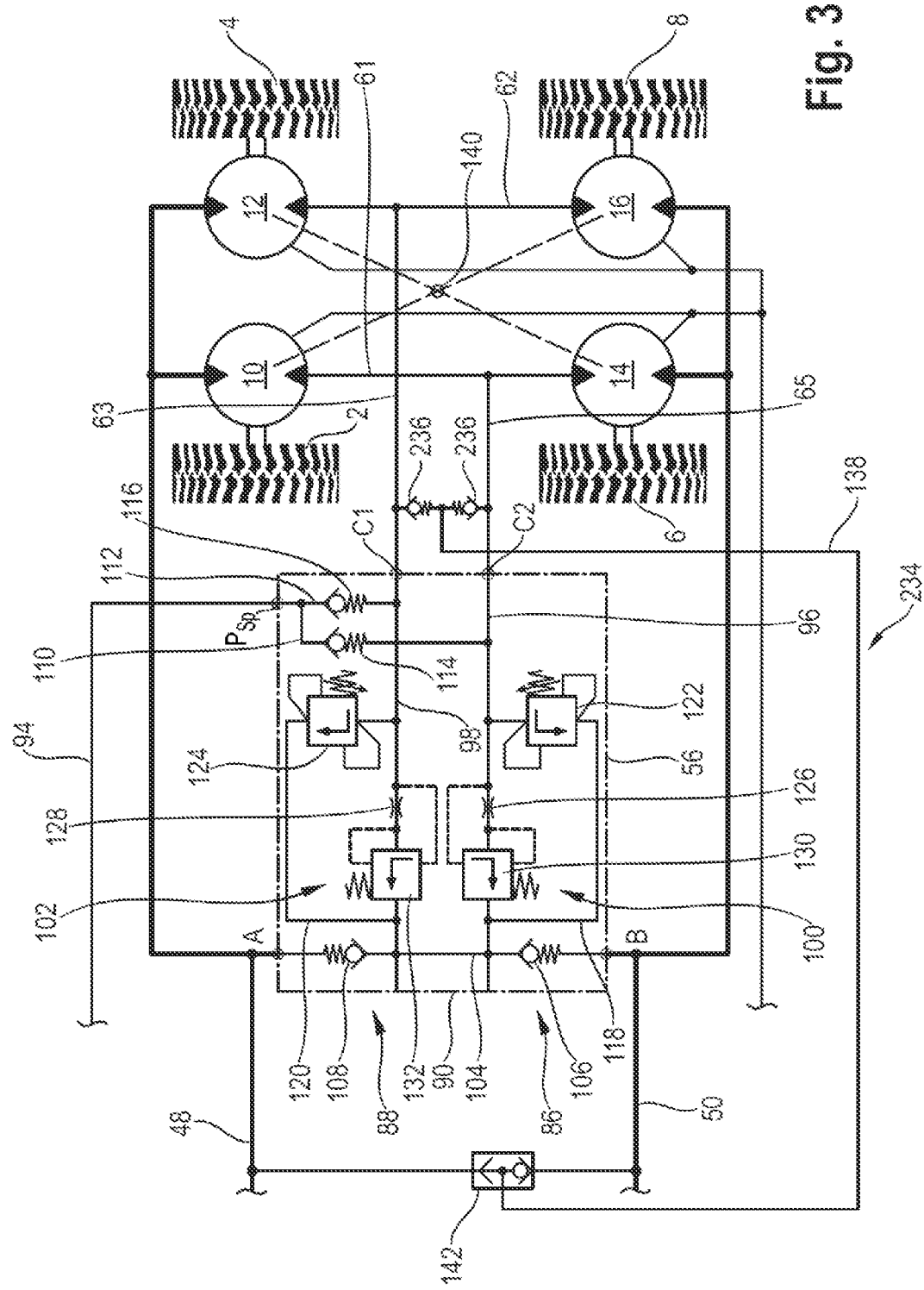
FIG. 3 an extract of a circuit diagram of a second exemplary embodiment of the hydrostatic travel drive according to the disclosure FIG. 4 a circuit diagram of a valve block of a third exemplary embodiment of the hydrostatic travel drive according to the disclosure, and FIG. 5 a circuit diagram of a fourth exemplary embodiment of the hydrostatic travel drive according to the disclosure.
Figure 4:
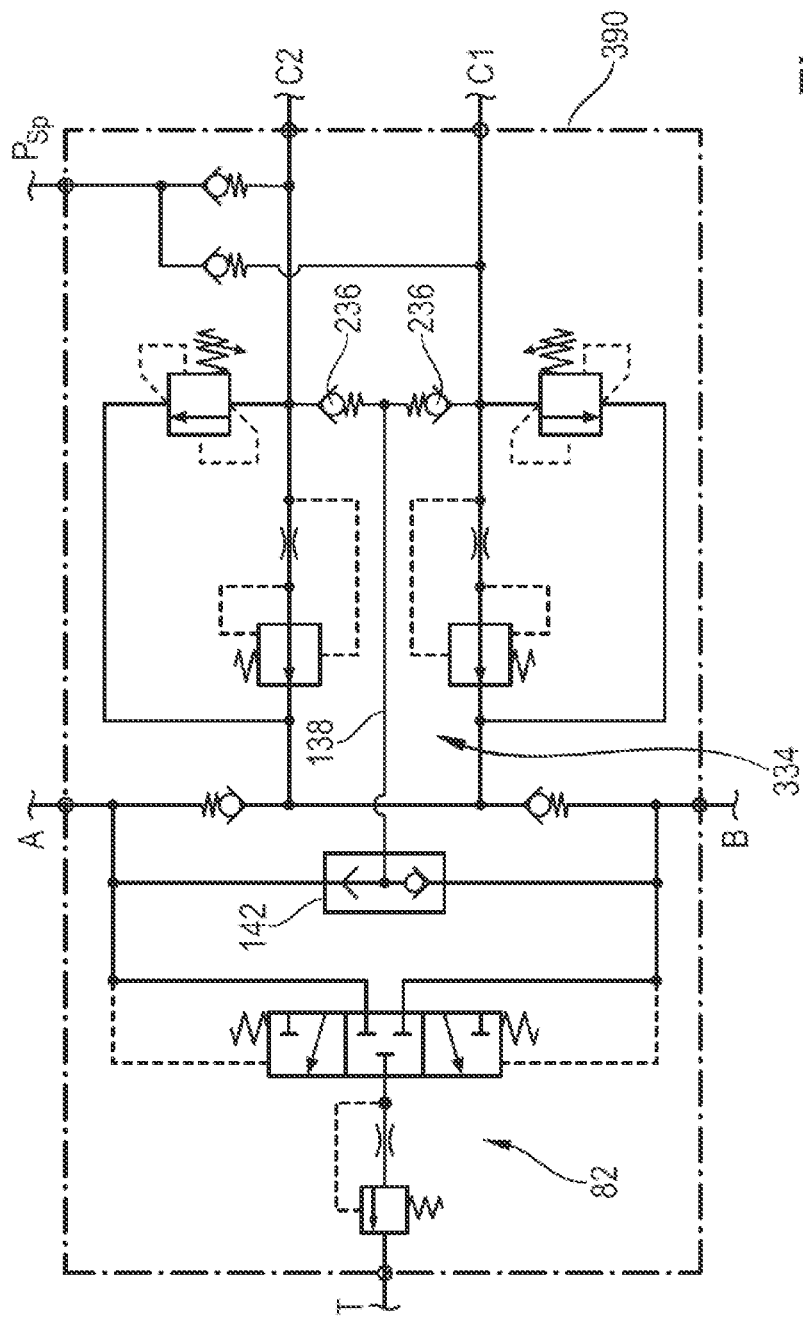
Figure 5:
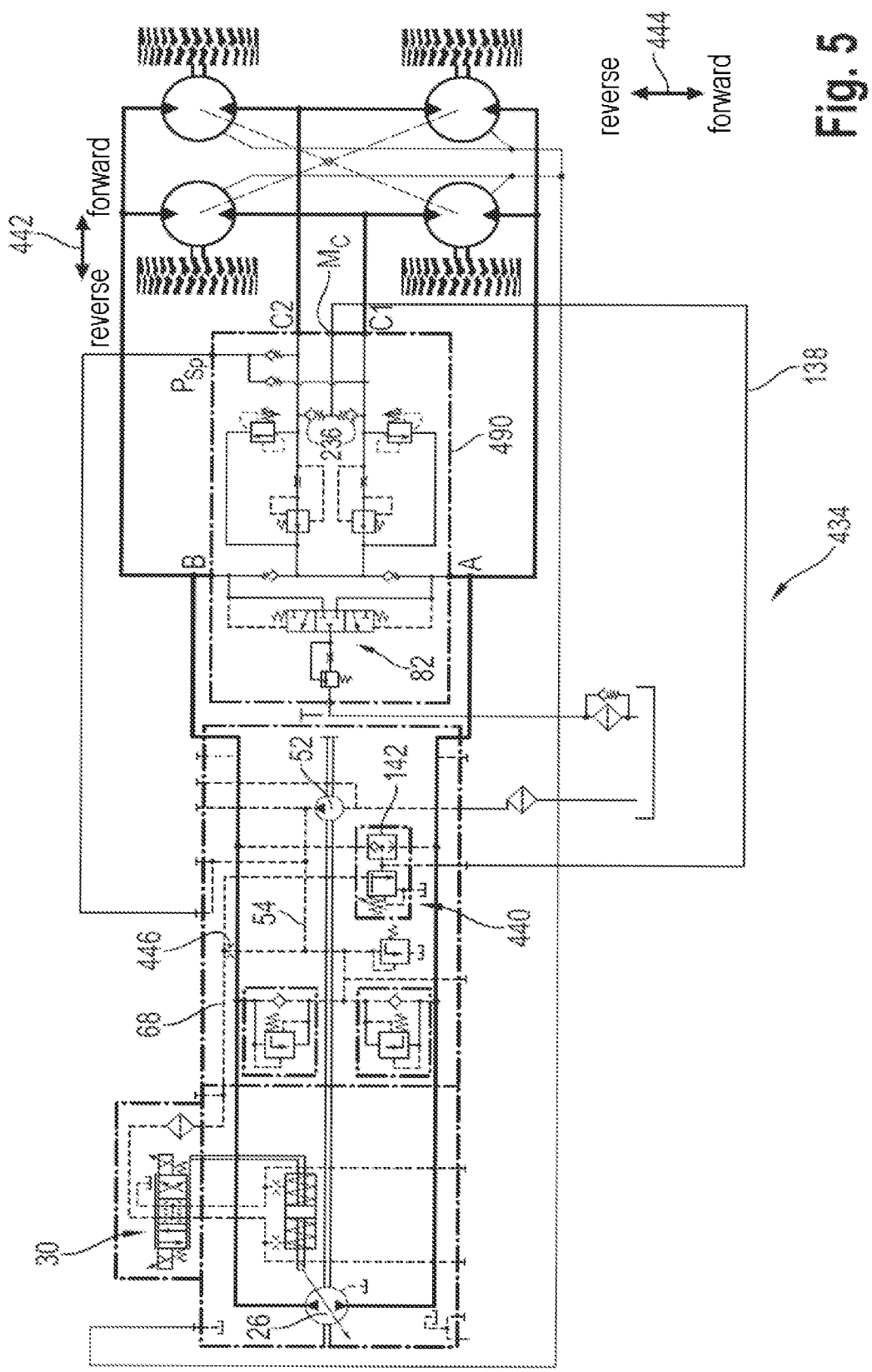

FIGS. 3, 4 and 5 each show a further exemplary embodiment of the travel drive according to the disclosure for a mobile working device with articulated steering, in which the first change-over valve 136 of the first exemplary embodiment is replaced by two check valves 236, each with a closing body pretensioned by a spring. The two check valves 236 close when, in normal operation, the pressure in one of the working lines is higher than the pressure in the pressure medium flow paths or line portions 61, 62. Therefore in the exemplary embodiments according to FIGS. 3, 4 and 5, the pressure relief check valve 146 in the pressure relief line 138 may be omitted. More precisely, a first check valve 236 is arranged between the channel 63 and the pressure relief line 138, wherein its opening direction is directed from the channel 63 towards the pressure relief line 138. Correspondingly, a second check valve 236 is arranged between the channel 65 and the pressure relief line 138, wherein its opening direction is directed from the channel 65 towards the pressure relief line 138.

FIG. 3 shows an extract of a circuit diagram of the second exemplary embodiment of the travel drive according to the disclosure. This exemplary embodiment corresponds to the first exemplary embodiment apart from said replacement of the change-over valve 136 by the two check valves 236, and the omission of the pressure relief check valve 146 and the orifice plate 144.

FIG. 4 shows a circuit diagram of a valve block 390 of the third exemplary embodiment of the travel drive. The valve block 390 is again a so-called High Efficiency Traction valve block, wherein by deviation from the valve block 90 of the first exemplary embodiment in FIGS. 1 and 2, change-over valve 142 and the entire pressure relief line 138 are integrated in this valve block 390. By deviation from the first exemplary embodiment according to FIGS. 1 and 2, the flushing valve unit 82 is also integrated in this valve block 390. As explained with reference to FIG. 1, the flushing valve unit 82 serves to branch off pressure medium from the working line serving as a discharge line 50 and allow it to flow via a filter and a cooler to the tank. For this the flushing valve unit 82 has a 3/3-way valve, a nozzle and a pressure retention valve. A first inlet connection of the 3/3-way valve and a first inlet connection of the change-over valve 142 are jointly connected to the port A of the valve block 390, while a second inlet connection of the 3/3-way valve and a second inlet connection of the change-over valve 142 are jointly connected to port B of the valve block 390.

FIG. 5 shows a circuit diagram of the fifth exemplary embodiment of the travel drive according to the disclosure, wherein the internal combustion engine 20 is not shown. In addition a flow direction double arrow 442 and a travel direction double arrow 444 are shown, wherein according to the arrows drawn, on reverse travel the pressure medium flows from port A via the motors to port B, and on forward travel from port B via the motors to port A. The connection between the flow direction of the pressure medium and the travel direction can naturally also be precisely reversed, so that on reverse travel the pressure medium flows from port B via the motors to port A and on forward travel from port A via the motors to port B.

The valve block 490 corresponds approximately to the valve block 390 of the preceding exemplary embodiment, wherein however the change-over valve 142 has been omitted and the valve block 490 instead has a pressure relief connection $M_c$. Furthermore, the travel drive according to FIG. 5 corresponds approximately to that of the first exemplary embodiment according to FIG. 1 with the following differences: the second feed pump of the first exemplary embodiment has been omitted. The flushing valve unit 82 has been moved to the valve block 490. Also a pressure shut-off valve 440 is assigned to the variable displacement pump 26, which valve has a control side at which the pressure from the working line with the higher pressure is supplied via the change-over valve 142. The pressure shut-off valve 440 in conjunction with a nozzle 446 reduces the supply pressure for the control valve 30 of the variable displacement pump 26 when the high pressure reaches a specific value. The nozzle 446 is here arranged between the feed line 54 and the control line 68. Instead of the additional change-over valve 142 assigned to the valve device 134; 234; 334, now the change-over valve 142 assigned to the pressure shut-off valve 440 is used to connect port C1 or C2 of the valve block 490 with the working line carrying the higher pressure.

A hydrostatic travel drive is disclosed with a hydraulic pump which is arranged with two hydraulic motor pairs in a hydraulic circuit. To prevent a pressure build-up between the hydraulic motors of a hydraulic motor pair when steering while stationary, a valve device is provided via which a pressure relief or connection to a working line or to low pressure can be opened. Furthermore a mobile working device with such a hydrostatic travel drive is disclosed. This in particular allows rapid steering of the working device while stationary.

What is claimed is:

1. A hydrostatic travel drive, comprising:
    four hydraulic motors connected in pairs in series, the hydraulic motor pairs each having a first hydraulic motor and a second hydraulic motor and each having a pressure medium flow path connecting an outlet of the first hydraulic motor with an inlet of the second hydraulic motor;
    a hydraulic pump arranged in pressure medium connection via at least two working lines with the four hydraulic motors; and
    a valve device configured to connect only the pressure medium flow path having the higher pressure to one of the at least two working lines having the lower pressure for pressure relief from the higher pressure medium flow path to the lower pressure working line.

2. The travel drive according to claim 1, wherein the pressure medium flow path with the higher pressure is configured to be connected to the working line configured as a supply line.

3. The travel drive according to claim 1, wherein:
    the valve device has a first change-over valve configured to tap into the higher of the pressures in the two pressure medium flow paths, and
    the first change-over valve has an outlet connected via a pressure relief line with an outlet of a second change-over valve, the second change-over valve having inlets connected to the working lines and configured to tap into the working line having the lower pressure.

4. The travel drive according to claim 3, wherein a valve arrangement is arranged in the pressure relief line between the change-over valves, the valve arrangement being configured to block a pressure medium flow in the direction of the first change-over valve and allow a flow in the opposite direction.

5. The travel drive according to claim 4, wherein the valve arrangement includes a check valve to which a flow valve is assigned.

6. The travel drive according to claim 5, wherein the flow valve is an orifice plate, a choke, or a shuttle.

7. The travel drive according to claim 1, further comprising:
    a change-over valve having inlets connected to a corresponding one of the at least two working lines; and
    a pressure relief line connected to an outlet of the change-over valve,
    wherein the valve device has two check valves, the check valves each having a spring-loaded closing body and a respective opening direction directed towards the pressure relief line.

8. The travel drive according to claim 7, wherein the two check valves are integrated in a valve block that has a flushing valve unit arranged therein.

9. The travel drive according to claim 8, wherein the change-over valve is integrated in the valve block.

10. The travel drive according to claim 7, further comprising a pressure shut-off valve, via which control pressure medium is configured to be extracted from a control pressure line, via which an actuating cylinder of the hydraulic pump is configured to be supplied, wherein a control pressure chamber acting in the opening direction of the pressure shut-off valve is connected to the outlet of the change-over valve.

11. The travel drive according to claim 1, wherein the travel drive is configured as a closed hydraulic circuit.

12. A mobile working device, comprising:
   four wheels; and
   a hydrostatic travel drive including:
      four hydraulic motors, driving a corresponding one of the four wheels, connected in pairs in series, the hydraulic motor pairs each having a first hydraulic motor and a second hydraulic motor and each having a pressure medium flow path connecting an outlet of the first hydraulic motor with an inlet of the second hydraulic motor;
      a hydraulic pump arranged in pressure medium connection via at least two working lines with the four hydraulic motors; and
      a valve device configured to connect only the pressure medium flow path having the higher pressure to one of the at least two working lines having the lower pressure for pressure relief from the higher pressure medium flow path to the lower pressure working line.

* * * * *